Aug. 13, 1935.  E. LORENZEN  2,011,110
OAT HULLING AND CLEANING MACHINE
Original Filed Dec. 24, 1927   3 Sheets—Sheet 1
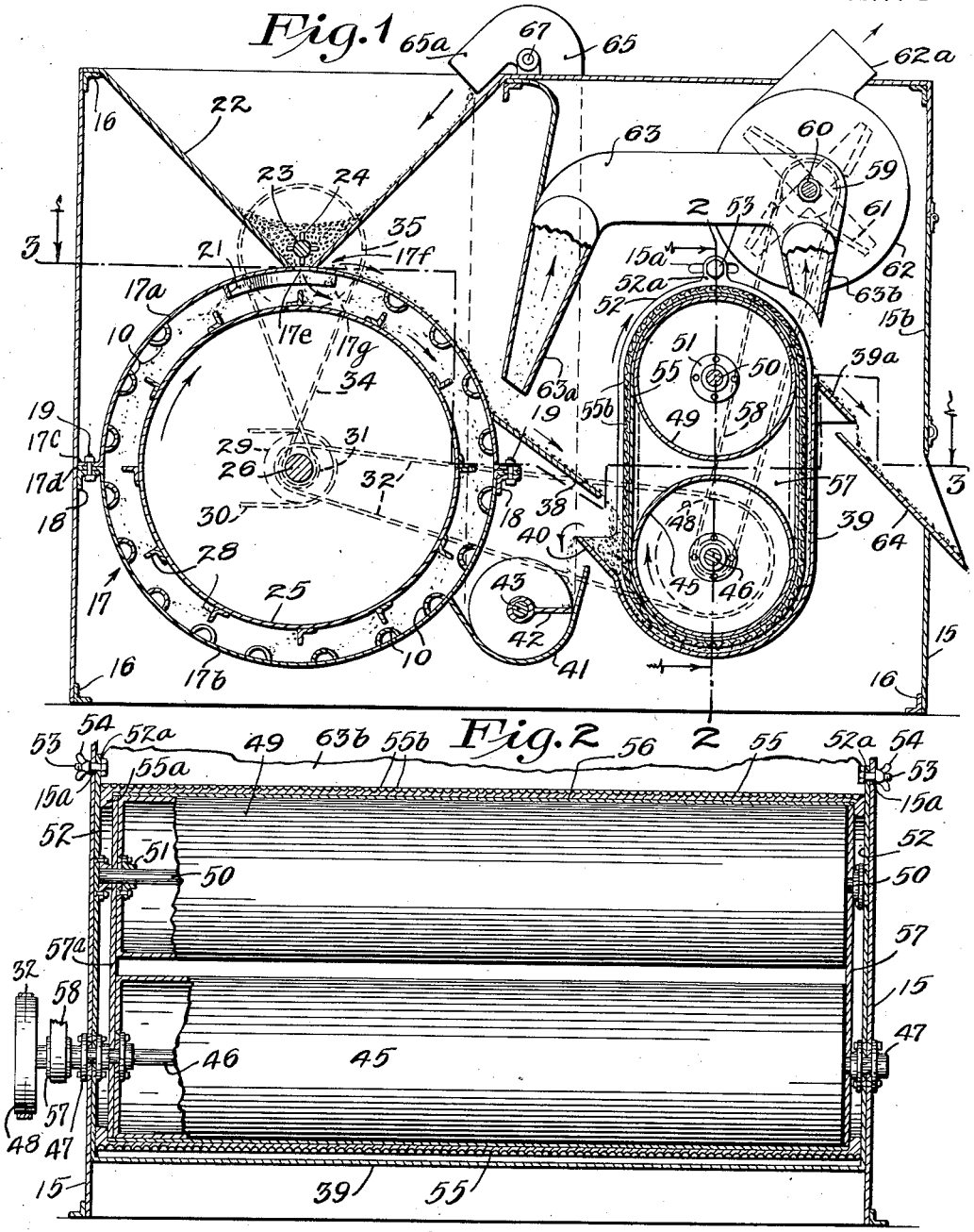
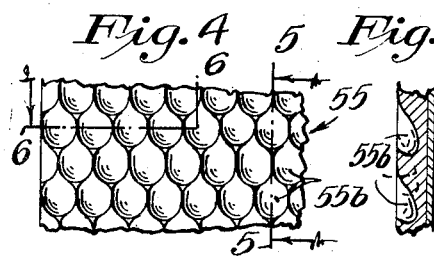
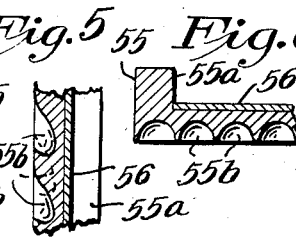
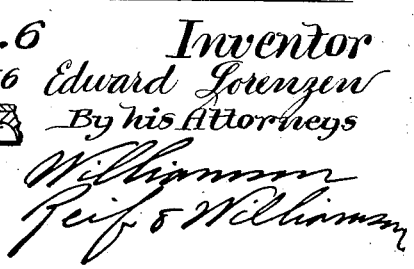
Inventor
Edward Lorenzen
By his Attorneys Aug. 13, 1935.  E. LORENZEN  2,011,110
OAT HULLING AND CLEANING MACHINE
Original Filed Dec. 24, 1927  3 Sheets-Sheet 2
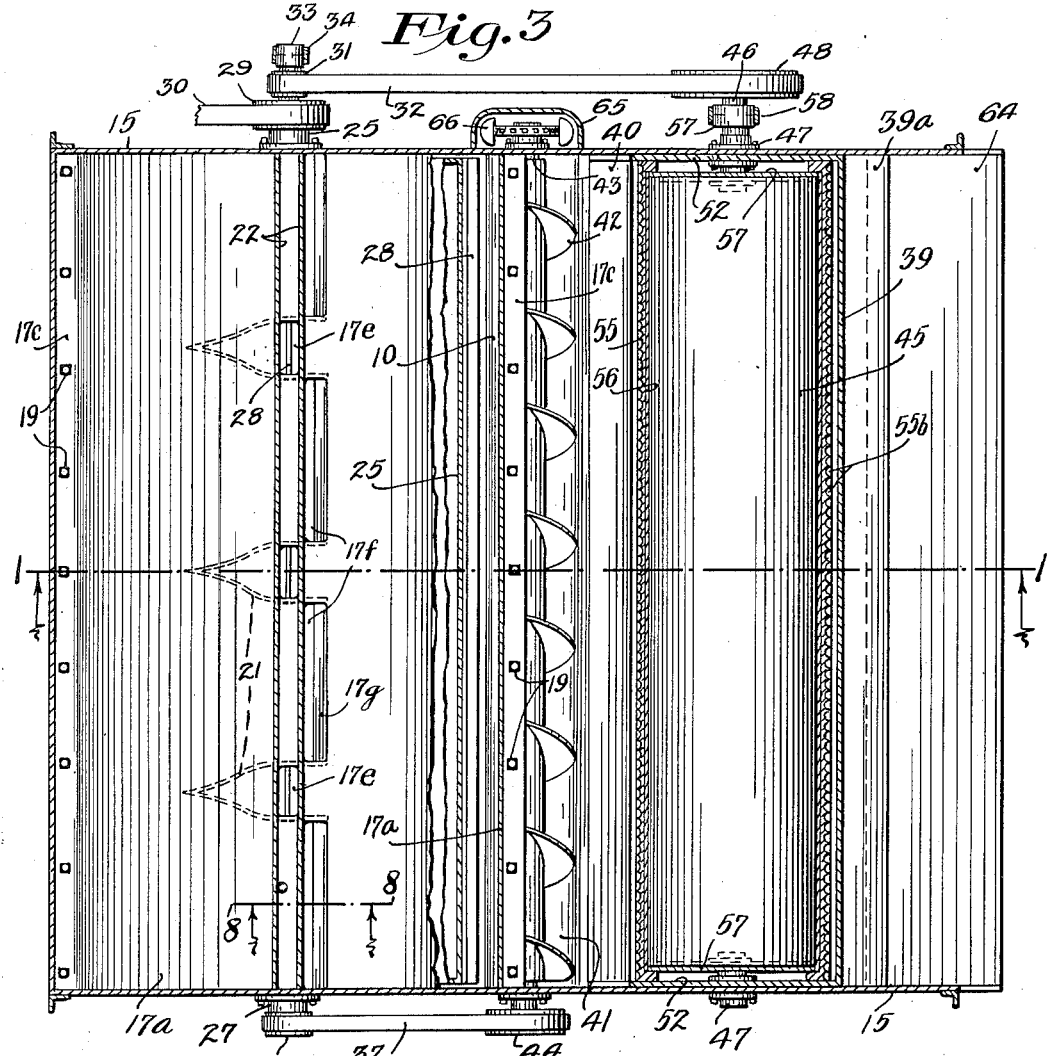
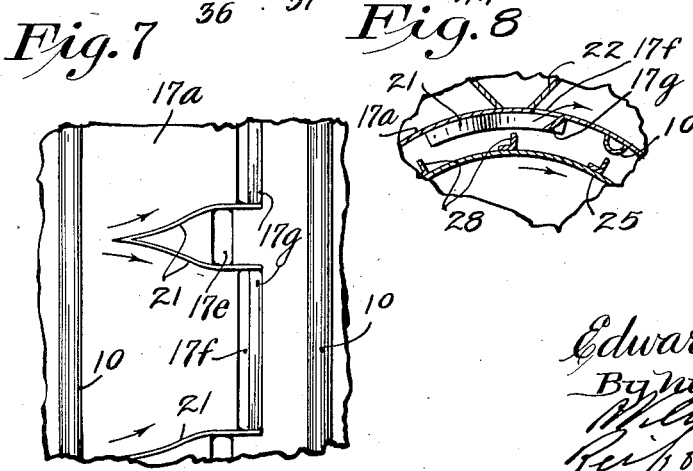
Inventor
Edward Lorenzen
By his Attorneys Aug. 13, 1935.  E. LORENZEN  2,011,110

OAT HULLING AND CLEANING MACHINE

Original Filed Dec. 24, 1927  3 Sheets—Sheet 3

Inventor
Edward Lorenzen
By his Attorneys

Patented Aug. 13, 1935

2,011,110

UNITED STATES PATENT OFFICE 2,011,110

OAT HULLING AND CLEANING MACHINE

Edward Lorenzen, Minneapolis, Minn.

Application December 24, 1927, Serial No. 242,412
Renewed August 16, 1933

9 Claims. (Cl. 83—30)

This invention relates to a machine for hulling and cleaning grain, and while the machine is capable of use for hulling and cleaning various kinds of grain, it particularly is designed for hulling and cleaning oats.

It is an object of this invention to provide a machine which will effectively hull and clean oats and other grain and which does not have to be driven at exceedingly high speed.

It is a further object of the invention to provide a grain hulling machine comprising a casing preferably of cylindrical form, having a series of convex or semi-cylindrical projections on its inner wall, and a rotating member comprising a drum having longitudinally extending bars thereon, said casing having a plurality of inlet ports, a plurality of outlet ports between and adjacent said ports, and spaced circumferentially therefrom, together with means for properly directing material relatively to said inlet and outlet ports.

It is a further object of the invention to provide a grain sorting or cleaning means comprising an endless belt or member of sheet material having a portion extending substantially vertically, adapted to pass through a supply of grain, and having a multiplicity of pockets or recesses in its surface, in which the hulled or cleaned grain may be received and carried.

It is a further object of the invention to provide a grain hulling means in combination with a device such as set forth in the preceding paragraph, a plurality of suction conduits being provided adapted to carry off the hulls and lighter materials.

These and other objects and advantages of the invention will be fully set forth in the following description made in connection with the accompanying drawings, in which like reference characters refer to similar parts throughout the several views and in which:—

Fig. 1 is a longitudinal vertical section taken on line 1—1 of Fig. 3;

Fig. 2 is a vertical section taken on line 2—2 of Fig. 1;

Fig. 3 is a horizontal section taken on line 3—3 of Fig. 1, said sections being taken as indicated by the arrows;

Fig. 4 is a partial view in front elevation of a side of the cleaning belt used;

Fig. 5 is a vertical section taken on line 5—5 of Fig. 4, as indicated by the arrows;

Fig. 6 is a horizontal section taken on line 6—6 of Fig. 4, as indicated by the arrow;

Fig. 7 is a partial plan of the inner side of the hulling casing;

Fig. 8 is a vertical section taken on line 8—8 of Fig. 3, as indicated by the arrows;

Figure 9:
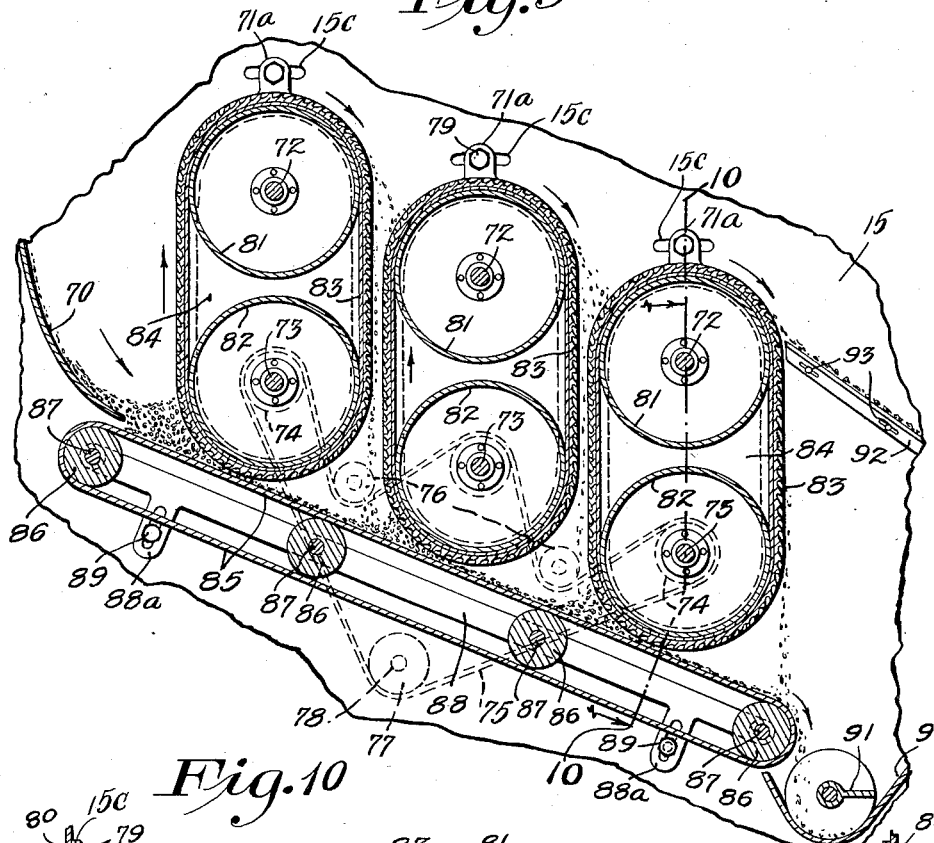
Fig. 9 is a vertical section similar to Fig. 1, showing a modified part of the machine.

Referring to the drawings, particularly Figs. 1 to 8, a grain hulling and cleaning machine is shown, comprising a casing 15 which will be made of wood or metal as desired and which is supported upon a frame comprising angle members 16 disposed at the corners thereof. The casing 15 is shown as having a door 15b at its rear end hinged at its upper edge and provided with a handle adjacent its lower edge. A hulling casing 17 is provided, comprising upper and lower sections 17a and 17b respectively, each comprising substantially a half-cylinder and having outturned longitudinally extending flanges 17c and 17d which are superposed and supported upon angle members 18 extending transversely of the casing 15, said flanges and angle members being connected by headed and nutted bolts 19. The casing 17 has closed ends formed by the sides of the casing 15 and has projecting inwardly from and secured to its inner wall, substantially semi-cylindrical ribs 20 having their convex sides directed inwardly. The casing 17 also has formed therein a plurality of inlet openings 17e longitudinally alined in spaced relation, and substantially V-shaped ribs or plates 21 are secured to the inner wall of said casing with their diverging ends embracing said openings, the points of said V-shaped members or ribs being directed oppositely to the travel of the material in said casing. A hopper 22 having downwardly converging sides is disposed above the drum or casing 17 and has a longitudinal opening at its bottom vertically alined with the inlet openings 17e. A shaft 23 extends longitudinally through hopper 22 just above the opening therefrom, being journaled in bearings (not shown) secured to the ends of casing 15, and has radial arms 24 secured thereto in spaced and staggered relation. Casing 17 also has formed therein between the inlet openings 17e the outlet openings 17f, a pair of these also being disposed between the end inlet openings 17e and the end walls of the casing. The openings 17f are considerably longer than the inlet openings 17e and in practice it has been found suitable to make the same about three times the length of the inlet openings. The outlet openings 17f are spaced slightly circumferentially from the openings 17e and are disposed at one side of the hopper 22. A deflecting plate 17g extends inwardly at the side of each of the inlet openings remote from the hopper 22 as shown in Fig. 8. A drum 25 is disposed in the casing 17 concentrically thereof and carried on a shaft 26 journaled in bearings 27 secured to the ends of housing 15. The drum 25 has secured to its periphery spaced angle bars 28 having one of their sides projecting outwardly radially so as to move in close proximity to the ribs 20. The shaft 26 carries at one side of the housing 15 a pulley 29 adapted to be driven by a belt 30 from any suitable source of power. Another pulley 31 is secured to shaft 26 over which runs a belt 32 for a purpose to be later described, and a third pulley 33 is secured to shaft 29 adapted to receive a cross belt 34 extending over a pulley 35 secured to the shaft 23 for driving the latter. At the end of the housing 15 opposite pulley 29, shaft 26 carries another pulley 36 over which runs a belt 37 for a purpose to be later described. A deflecting portion or plate 38 extends downwardly from the outer side of the casing or trough 39 and is disposed at one side of the casing 17 having a substantially semi-cylindrical bottom from one side of which, below the free edge of plate 38 is disposed an overflow spout 40 and a discharge plate 39a projects downwardly in an inclined direction from the opposite and upper side of trough 39. A trough 41 extends below spout 40 and between the same and casing 17, in which is disposed a helical conveyor 42 carried on a shaft 43 which has secured to one end a pulley 44 over which runs a belt 37 already referred to. A roller or drum 45 extends longitudinally of the trough 39 concentrically with its lower end, which drum is mounted on a shaft 46 extending longitudinally through casing 15 and being journaled in bearings 47 secured in the walls thereof. The shaft 46 has secured thereto without the casing 15, a pulley 48 over which runs a belt 32 whereby pulley 48 is driven. Another drum 49 similar to the drum 45 is disposed above the latter and mounted on the shaft 50 also journaled in bearings 51 secured to plates 52 disposed immediately inside of the end walls of the casing 15. The plates 52 have lugs 52a at their upper ends through which extend headed bolts 53 which project through slots 15a in the end walls of the casing 15 and are adapted to be held in various positions in said slots by the thumb nuts 54. An endless member 55 of flexible material such as rubber or rubberized fabric has a layer of heavy canvas 56 at its inner side, which runs over the drums 45 and 49 as shown in Figs. 1 and 2. The member 55 has end flanges 55a which extend over the ends of the drums 45 and 49 and fit snugly between the plates 52 and plates 57a disposed closely adjacent the ends of the drums 45 and 49. The member 55 has formed in its outer surface a multiplicity of small pockets or recesses 55b as shown in Figs. 4 to 6. The recesses 55b are preferably arranged in rows, the recesses in adjacent rows being staggered. The shaft 46 of the lower roller 45 has secured thereto outside of the casing 15 another pulley 57 over which runs a belt 58, which belt also passes over another pulley 59 secured to a shaft 60 extending transversely of the casing 15 adjacent one upper corner thereof. The shaft 60 carries a fan 61 disposed in the fan casing 62 having an outlet spout 62a directed upwardly through the top of the casing 15. The fan casing 62 has an inlet spout with which communicates a conduit 63 having one portion 63a thereof disposed over the upper end of a plate 38 and adjacent the same, and said conduit has another arm 63b disposed over the upper rear side of the belt 55. A discharge plate or chute 64 is spaced a short distance below discharge plate 39a and extends through the rear wall of the casing 15. The conveyor 42 delivers into a casing 65 at one side of the casing 15 which extends vertically along said side and has a discharge spout 65a delivering into the hopper 22. An endless bucket conveyor 66 travels in casing 65, running over suitable chain sprockets on shaft 43, and a shaft 67 journaled in the top of the casing.

In operation the grain to be hulled is placed in the hopper 22. Belt 30 will be driven from a suitable source of power and through the belts 32, 35, and 37, as well as belt 58, drum 25 will be rotated, roller 45 will be driven, thus moving the endless member 55, conveyors 42 and 66 will be operated, and fan 61 driven. The shaft 23 with its members 24 will be driven in a counter-clockwise direction, and the grain will be fed through the opening in the bottom of the hopper into the inlet openings 17e. The drum 25 is rotated in the direction of the arrow shown in Fig. 1, and as the grain passes into the casing, it will be met by the bars 28 and carried in a clockwise direction, being thrown against the ribs 20. The grain will rebound from the ribs and will thus be repeatedly engaged by bars 28 and the various ribs so that the hulls will be effectively separated therefrom. It has been found that if grain is projected against angular surfaces, the same is apt to be broken. The rounded or convex surfaces of the ribs 20, however, act effectively to hull the grain without breaking the same. It will be seen that the grain is prevented from passing out of the outlet openings 17f by the V-shaped deflectors 21. The grain is carried around the casing 17 and when it reaches the deflectors 21 it is directed out of alinement with the inlet openings 17e and into alinement with the outlet openings 17f. The grain will be directed through the outlet openings by the deflectors 17g and will be delivered to the outside of the casing 17 at the right of the hopper 22 as shown in Fig. 1. The hulled grain, loose hulls and any grain which may not be hulled, passes down over the top of the casing 17 and onto the plate 38. A strong suction takes place in the spout 63a and the hulls and lighter materials such as any dust and dirt are drawn upwardly into said spout and the conduit 63 and will pass into the fan casing 62 and be delivered through the outlet 62a. The hulled grain, together with any grain which is not hulled, will pass down plate 38 and into the casing or trough 39. The endless member 55 travels over rolls 45 and 49 continuously, passing down around through the accumulated material in the bottom of said trough. The pockets 55b are of such shape and size that a kernel of cleaned, hulled grain will be received therein and will be carried upwardly with member 55. Any unhulled grain, however, is too long to stay in said pockets and will fall therefrom when the surface of the member 55 becomes substantially vertical. The unhulled grain will therefor drop from the apron and will gradually fill the trough 39, the clean grain being continuously picked up and carried upward by member 55. When the unhulled grain fills the trough 39, the same will be pushed along by the member 55 and will overflow from spout 40 into trough 41. This grain will then be carried transversely by conveyor 42 into the conveyor casing 65 and will be delivered by conveyor 66 back to the hopper 22, from which it will again pass through the hulling casing. It will be seen that the inclination of the apron 55 may be varied by adjusting the bolts 53 in the slots 18a. The hulled and cleaned grain carried up by the apron 55 is discharged at the upper rear side of said apron as it passes over the roll 49 and said grain will also pass onto the discharge plate 39a and into the chute 64 from which it will be delivered outside of the housing 15. A strong suction is also exerted in the spout 63b at the point where the grain is discharged from apron 55, so that any dust, light material, or hulls which may have been separated in trough 39 will be taken from the grain and carried into the fan casing 62 and discharged through the fan 62a. It will be seen that the plates 57a extend across the ends of the rollers 45 and 49 and are overlapped by the flanges 55a of the casing 15, which flanges also move snugly against the outer plates 52. A very tight structure is thus afforded so that no grain or hulls can get beneath the belt 55 and interfere with its proper operation.

The door 15b of the casing can be opened at any time to give access to the belt or apron 55 and to inspect the operation thereof.

Figure 10:
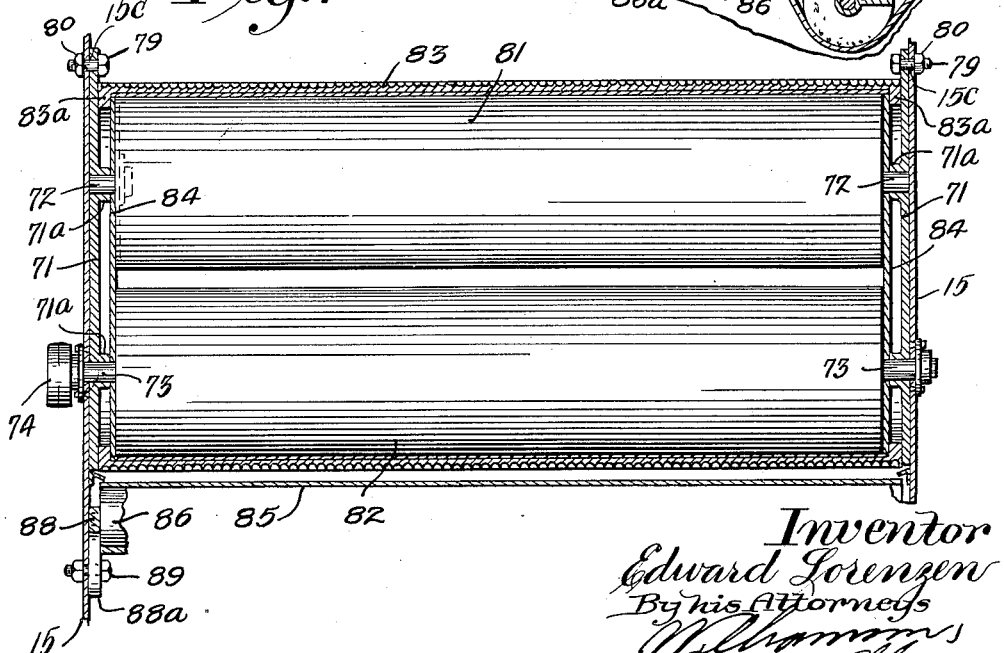
Fig. 10 is a vertical section on line 10—10 of Fig. 9.

In Figs. 9 and 10 a modified form of the cleaning apparatus is shown. With this form the housing 15 will be made longer and the grain delivered from the hulling casing will be delivered to a plate 70. A plurality of plates 71 are provided of oblong shape, having bearings 71a in which are journaled the shafts 72 and 73, shafts 73 also running in bearings secured to casing 15. While the number of the plates 71 and said shafts may be varied, in the embodiment of the invention illustrated three of said plates are shown having three of the shafts 72. The shafts 73 have pulleys 74 secured thereto and will be driven by a belt 75 running thereover and over suitable idler pulleys 76, said belt being driven by a pulley 77 secured to a driven shaft 78. The plates 71 have lugs 71a at their upper ends which are secured to plates 79 extending through slots 15c which will be provided in the casing wall, which are similar to the slots 15a already described. The bolts 79 can be clamped in suitable position by the nuts 80. Shafts 72 and 73 have secured thereto respectively the drums 81 and 82. The endless belts or aprons 83 travel over the drums 82 and 81, which belts are similar in construction to the belt or apron 55 already described and the same will have the flanges 83a overlapping oblong plates 84 extending across the ends of the drums, thus forming a tight closure so that no grain can get beneath said aprons. Another endless belt or apron 85 is provided, the upper run of which extends downwardly in an inclined direction below the aprons 83, said belt 85 running over rollers 86 secured to shafts 87 respectively journaled in the frame 88. Said frame 88 has slotted arms 88a through which extend clamping bolts 89 so that said frame 88 and belt 85 may be adjusted as necessary when the aprons 83 are adjusted by the bolts 79. The belt 85 will be suitably driven by controlling one of the rollers 86. A trough 90 is disposed at the lower end of the belt 85, having therein a screw conveyor 91. This conveyor will deliver transversely of the machine and into an elevator casing similar to casing 65 which will return the material delivered thereto back to the hopper 22. A discharge plate 92 is provided extending close to the rear side of the rear apron 83, which plate is made longitudinally adjustable by having slots formed in its under side through which pass the clamping bolts 93.

In the operation of the device shown in Figs. 9 and 10, the hulled grain with the hulls and with any unhulled grain which may pass from casing 17 are delivered to the plate 70. The hulls and lighter materials will be drawn off by the spouts 63a and the remainder will pass down onto the belt 85. The first apron 83 will engage this grain as it passes around the lower roller 82 and the hulled grain will be taken up in the pockets of said apron and carried upwardly therewith. The mass of material accumulates at the front of the belt so that it is repeatedly acted on by said belt. The belt 85 is travelling downward and the unhulled grain which is not picked up or falls from the apron 83, is eventually carried downward. The material carried upward by the first apron 83 is delivered against the second apron 83 and against the upwardly travelling side thereof. Some of this grain will immediately find lodgment in the pockets of said apron and some will drop to the belt 85. The material again accumulates in front of the second apron 83 and is continuously engaged thereby so that the clean and hulled grain is picked up and carried upwardly, the unhulled grain being carried downwardly by belt 85. This action is again repeated by the third apron 83 to which the material carried upward by the second apron is delivered. The clean and hulled grain carried up by the third apron 83 is delivered to the plate 92 and will be discharged from the machine. The unhulled grain which is discharged at the lower end of the belt 85 passes into trough 90 and will be delivered back to the hopper for rehulling. By the successive treatment of the grain by the aprons 83, a much more perfect separation of the grain and hulls is attained. It will be seen that the inclination of one or all of the aprons 83 may be varied and the position of the belt 85 could also be varied accordingly. This latter belt can also be positioned nearer or farther from the aprons 83.

From the above description it is seen that applicant has provided a very simple and efficient grain hulling and cleaning machine. The grain is very effectively hulled and this is done by rotating drum 25 at a moderate speed compared to the speed of the hulling devices of the prior art. The surface of the grain separating apron is of great area and contains a very large number of grain receiving pockets so that the machine is of large capacity. The device has a high degree of utility especially in the hulling of oats. The same is comparatively simple and can be made quite rugged in construction. The machine is also quite durable and requires little attention for maintenance.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. A grain hulling device having in combination, a hopper, a substantially cylindrical casing below said hopper, said casing having a series of longitudinally spaced inlet openings and having spaced projections on its inner wall, a rotary member in said casing having longitudinally extending projections moving in close proximity to said spaced projections, said casing also having a plurality of outlet openings circumferentially spaced from said inlet openings and disposed alternately therewith longitudinally of said casing, spaced inclined deflecting means converging substantially to a point in front of said inlet openings and extending at each side thereof to prevent material fed into said inlet openings from passing out of said outlet openings before passing around said casing, and to deflect the material which has passed around said casing to said outlet openings.

2. A grain hulling device having in combination, a hopper, a substantially cylindrical casing below said hopper, said casing having a series of longitudinally spaced inlet openings, said casing also having a plurality of outlet openings spaced longitudinally circumferentially from said inlet openings and alternating longitudinally therewith, said casing having on its inner wall circumferentially spaced substantially semi-cylindrical ribs extending longitudinally thereof, a drum rotatable in said casing having circumferentially spaced bars extending longitudinally thereof adapted to travel in close proximity to said semi-cylindrical ribs, and means for deflecting the grain from alinement with said inlet openings and into alinement with said outlet openings.

3. A grain hulling and cleaning device having in combination, a hulling means having discharge openings, a chamber having a downwardly inclined bottom to which the grain and hulls pass from said discharge openings, a suction conduit above said bottom for drawing off the hulls, a trough into which the remaining grain hulls and unhulled grain pass, an endless member travelling through said latter trough having an upwardly moving substantially vertical surface, said member containing a multiplicity of pockets adapted to receive and carry only hulled grain, a chamber to which said endless member discharges, an overflow means in said trough for unhulled grain, means for returning the material passing through said overflow back to said hulling device, and a suction conduit disposed above the discharge end of said endless member.

4. A grain hulling device having in combination a substantially cylindrical casing having a series of longitudinally spaced narrow inlet openings at its upper side, a hopper disposed above said inlet openings and having a discharge opening communicating therewith, said casing also having a plurality of outlet openings circumferentially spaced from said inlet openings and alternating longitudinally therewith, spaced means projecting from the inner wall of said casing, a rotatable member in said casing having peripheral means thereon adapted to travel in close proximity to such projections, means for deflecting grain from alignment with said inlet openings into alignment with said outlet openings, and deflecting means between said means and aligned with said outlet openings extending inwardly from the wall of said casing adapted to guide material out of said outlet openings.

5. A grain hulling and cleaning device having in combination, a hulling means having discharge openings, a chamber having a downwardly inclined bottom to which the grain and hulls pass from said discharge openings, a suction conduit above said bottom for drawing off the hulls, a semi-cylindrical trough to which said bottom delivers, a drum in said trough substantially coaxial therewith, an endless apron movable over said drum and having substantially vertical runs and having pockets in its surface extending downwardly therein in an inclined direction so as to point upwardly and outwardly in said vertical runs, said pockets being of shallow depth adapted to receive and carry upward the hulled grain but being so shaped that an unhulled grain will fall therefrom, said trough having an overflow means at the side of the upwardly movable vertical run, a receptacle receiving from said overflow means, a conveyor for receiving from said receptacle and carrying unhulled grain back to said hulling means and a fan adapted to cooperate with said apron for drawing off light material and discharge the same from said device.

6. A grain hulling and cleaning machine having in combination, hulling means having a discharge opening, means receiving the hulled and unhulled grain from said opening, a trough receiving the same from said means, a member movable through said trough for separating and carrying therefrom hulled grain, a receptacle receiving unhulled grain from said trough, a conveyor receiving said unhulled grain from said receptacle and constructed to deliver the same to said hulling means, an air means drawing light material from said first mentioned means and from said separating means and discharging the same from said device.

7. An oat hulling machine having in combination, a hulling casing, a rotating hulling member therein, said casing having an inlet opening and having an outlet opening through which material is discharged by said rotating member, means for separating hulled and unhulled grain disposed at one side of said casing, a member over which said material from said cylinder passes toward said separating means, a suction conduit disposed above said last mentioned member for drawing off a portion of the lighter material, a discharge means to which said separating means delivers the hulled grain, a second suction conduit acting on the material adjacent said discharge means and means for returning the unhulled grain from said separator to said casing.

8. An oat hulling machine having in combination, a substantially cylindrical hulling casing, ribs on the interior of said casing extending longitudinally thereof forming in effect, corrugations, a rotatable hulling cylinder in said casing, ribs extending longitudinally of said cylinder and projecting therefrom, movable adjacent said first mentioned ribs in the rotation of said cylinder, said casing having an inlet opening extending longitudinally thereof and an outlet opening extending longitudinally thereof spaced from said inlet opening, the material being fed to said casing being carried around said casing by said cylinder and ribs thereon and discharged through said outlet opening, a device for separating the hulled and unhulled oats, a member over which the material passes from said casing to said device, means for drawing off the lighter material from said member, a discharge means for hulled oats leading from said separator, an aspirating conduit adjacent said discharge means and means for returning the unhulled oats from said separator back to said hulling casing.

9. An oat hulling and separating machine having in combination, an enclosing casing, a hulling casing within and at one side of said casing, a rotating hulling cylinder in said hulling casing, said hulling casing having inlet and outlet openings, feeding means for feeding material into said inlet opening, a separator for separating hulled and unhulled oats within said enclosing casing and at one side of said hulling casing, a plate adapted to receive hulled and unhulled oats from said outlet opening and direct the same toward said separator, an aspirator conduit disposed over said plate for drawing off loose hulls and lighter material, said separator having a discharge means for hulled oats, an aspirator conduit adjacent said discharge means, said separator having a discharge means for unhulled oats and means for conveying said unhulled oats from said discharge means to said feeding means.

EDWARD LORENZEN.